(12) United States Patent
Fournier Bureau (10) Patent No.: US 10,292,532 B2
(45) Date of Patent: May 21, 2019

(54) BARBEQUE UTENSIL AND TOOL HOLDER

(71) Applicant: Caroline Fournier Bureau, Harvie Heights (CA)

(72) Inventor: Caroline Fournier Bureau, Harvie Heights (CA)

(*) Notice: Subject to any disclaimer, the term of this patent is extended or adjusted under 35 U.S.C. 154(b) by 255 days.

(21) Appl. No.: 15/297,379

(22) Filed: Oct. 19, 2016

(65) Prior Publication Data

US 2017/0112322 A1  Apr. 27, 2017

(30) Foreign Application Priority Data

Oct. 21, 2015 (GB) .................................. 1518693.5

(51) Int. Cl.
*A47J 37/07* (2006.01)
*A47J 45/02* (2006.01)

(52) U.S. Cl.
CPC ........... *A47J 37/0786* (2013.01); *A47J 45/02* (2013.01)

(58) Field of Classification Search
CPC ............. A47J 37/02; A47J 45/02; A47J 47/16
USPC ........................................................ 99/357
See application file for complete search history.

(56) References Cited

U.S. PATENT DOCUMENTS

| | | | |
|---|---|---|---|
| 2,572,797 A | 10/1951 | Zimmer | |
| 3,115,107 A | 12/1963 | Glenny | |
| 4,140,256 A | 2/1979 | King | |
| 4,745,905 A * | 5/1988 | Lucky | F24C 15/36 126/211 |
| D354,841 S | 1/1995 | Bussell | |
| 5,934,721 A * | 8/1999 | Walde | A47J 37/0786 294/3 |
| D436,004 S | 1/2001 | Wagner | |
| D454,753 S | 3/2002 | Pai | |
| D527,987 S | 9/2006 | Kelleghan | |
| 2009/0289511 A1 | 11/2009 | Kim | |
| 2011/0271950 A1 | 11/2011 | Nilssen, III | |
| 2012/0169080 A1 * | 7/2012 | Janocha | A47J 37/0786 294/99.2 |
| 2013/0164421 A1 | 6/2013 | Hill et al. | |
| 2016/0081514 A1 * | 3/2016 | Cauble | A47J 33/00 426/523 |

* cited by examiner

*Primary Examiner* — Nina Bhat (57) ABSTRACT

A Bar B Q utensil and tool holder has a head member; a first and a second hollow horn member so fashioned so as to hold utensils; a spatula hooked onto a spatula hook located at the rear of the head member; push buttons releasably engaging holes so as to control the release of utensils; a scrubber brush inserted inside the head and behind a lid member; an adjustable clip member located at the rear of the head member so as to allow for the tool holder to be attached to a handle member used for lifting a hood member on bar B Q grill.

11 Claims, 8 Drawing Sheets

BARBEQUE UTENSIL AND TOOL HOLDER

FIELD OF THE INVENTION

The present invention relates generally to implements used for holding and storing hand tools and the like but more particularly to a barbeque utensil and tool holder.

BACKGROUND OF THE INVENTION

Barbeque is a popular leisure activities that requires several types of utensils and related hand tools for cleaning and handling wither the food being prepared or to clean and maintain the barbeque grill in good working condition. Because of the plurality of implements used, there is room for improvement in procuring a useful and convenient way to keep all those implements securely held together, especially when using a barbeque grill on a movable platform such as a boat.

SUMMARY OF THE INVENTION

In view of the foregoing disadvantages inherent in the known devices now present in the prior art, the present invention, which will be described subsequently in greater detail, is to provide objects and advantages which are: To provide for a barbeque utensil and tool holder.

In order to do so, the invention is comprised of a head member; a first and a second hollow horn member so fashioned so as to hold utensils; an adjustable clip member to attach the utensil and tool holder onto a support member.

The barbeque utensil and tool holder has a spatula hooked onto a spatula hook located at the rear of the head member.

There are push buttons releasably engaging holes located in the first and the second hollow horn member so as to control the release of utensils.

A scrubber brush is inserted inside the head and behind a lid member.

The adjustable clip member is located at the rear of the head member so as to allow for the utensil and tool holder to be attached to a handle member forming part of a hood member on barbeque grill.

The support member consists in a horizontal bar held between a pair of bracket members for mechanically fastening the support member onto a surface.

There is an optional carrying handle to carry the utensil and tool holder.

The barbeque utensil and tool holder is generally used in combination with a barbeque grill.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

A barbeque utensil and tool holder (10) has a head (12) generally shaped to look like the head of a long horn steer. A first horn member (14) is hollow and can hold an implement such as a fork (16) and a second horn member (14') is also hollow so as to hold an implement such as a pincer (18).

Figures 7A, 7B:
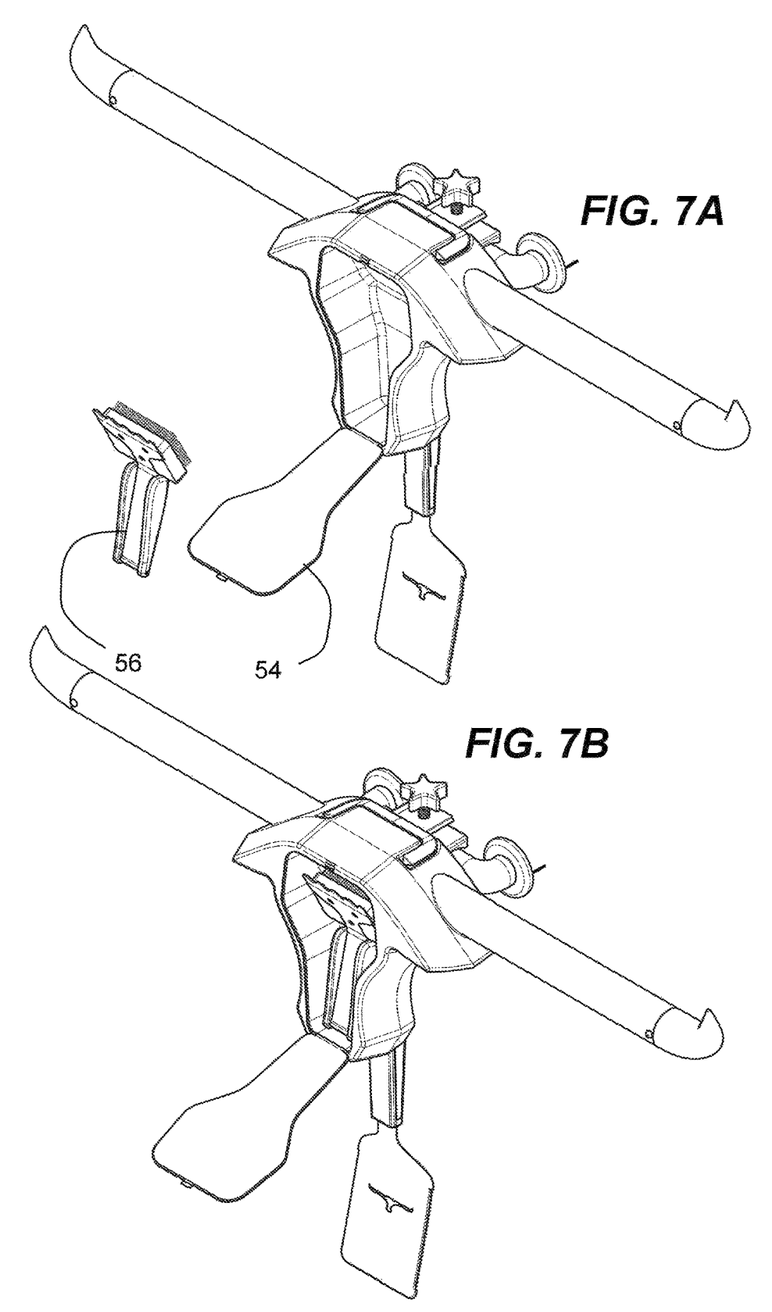
FIG. 7A isometric view favoring the front with scrubber brush outside.
FIG. 7B Isometric view favoring the front with scrubber brush inside the head.
Figure 8A:
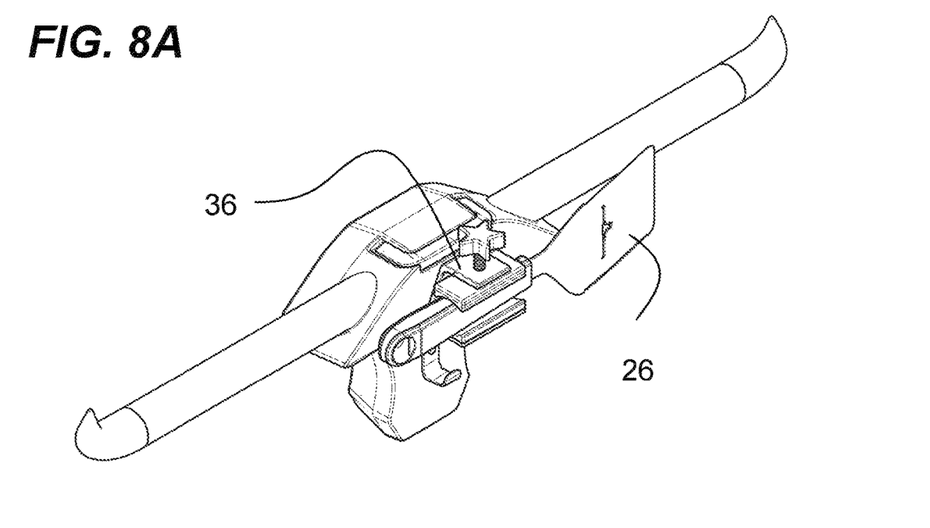
FIG. 8A Isometric view favoring the rear to show the installation of the spatula during transport.
Figure 8B:
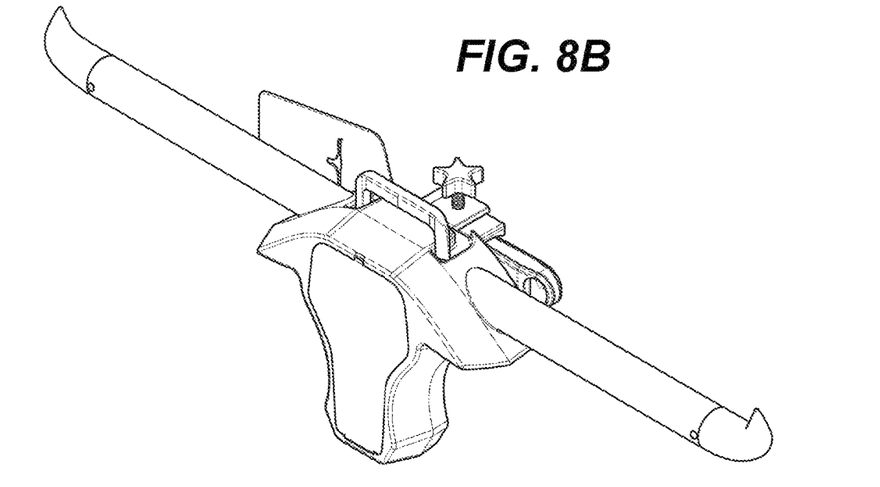
FIG. 8B Isometric view favoring the front to show the installation of the spatula during transport.

A spatula (26) is hooked onto a spatula hook (34) located at the rear of the head (12). Push buttons (30) releasably engaging holes (32) control the release of the fork (16) and the pincer (18). FIGS. 7AB show that by flipping down a lid portion (54), a scrubber (56) can be located inside the head (12). A carrying handle (55) can be used to carry the tool holder (10) to and from a barbeque grill (38) if a user does not want to hook it up permanently to the barbeque grill (38).

At the rear of the head (12) is an adjustable clamp member (36) which allows for the tool holder (10) to be attached to a handle member (42) such as those generally found on barbeque grills (38) and used for lifting a hood member (40). The clamp member (36) has a tightening screw (48) driving down a pressure plate (50) against a base plate (52) so as to tighten, or reverse the screw's (48) rotation so as to vary the pressure on the pressure plate (50). The clamp member (36) can also be used for attaching the spatula (26) when carrying the holder (10).

Figure 1:
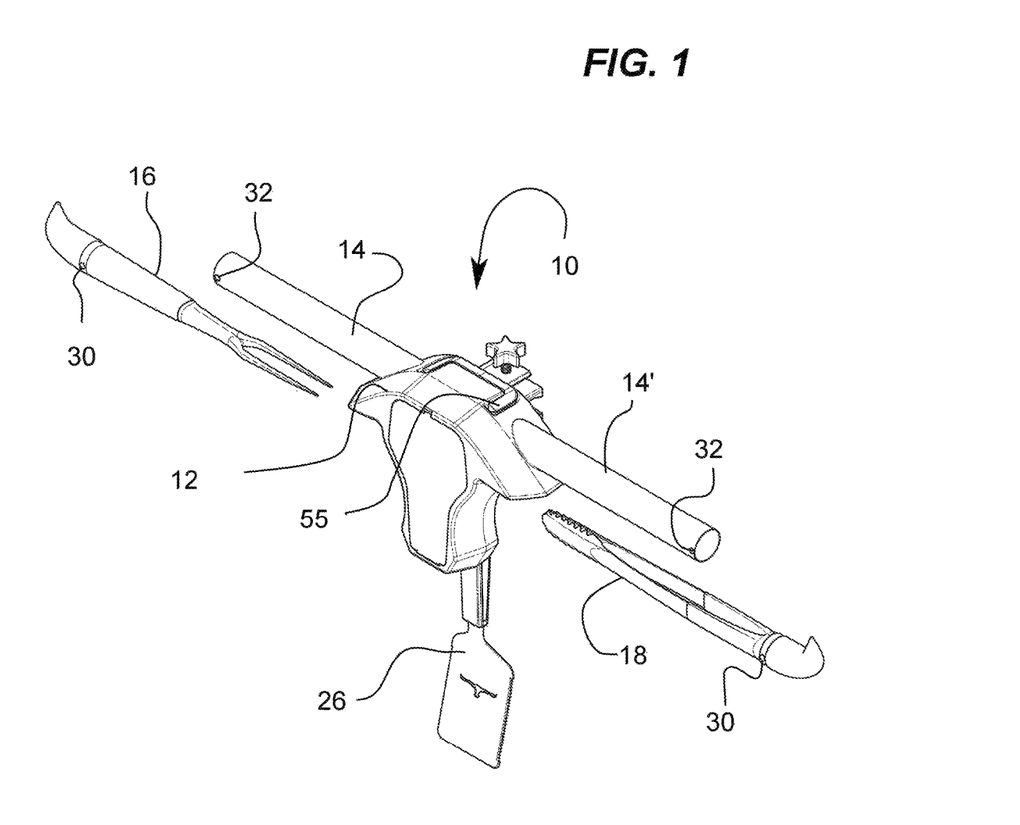
FIG. 1 Exploded view of the invention
Figure 2:
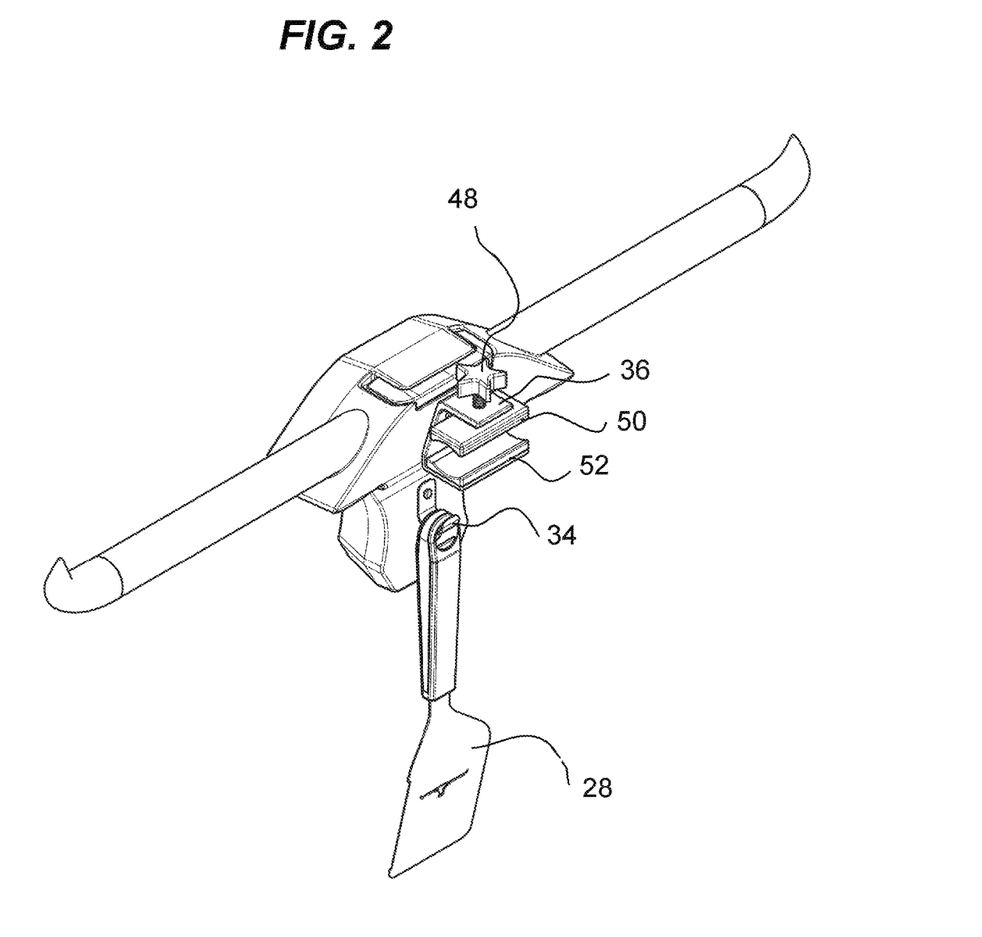
FIG. 2 Reverse angle view of FIG. 1 favoring the rear of the invention.
Figure 3:
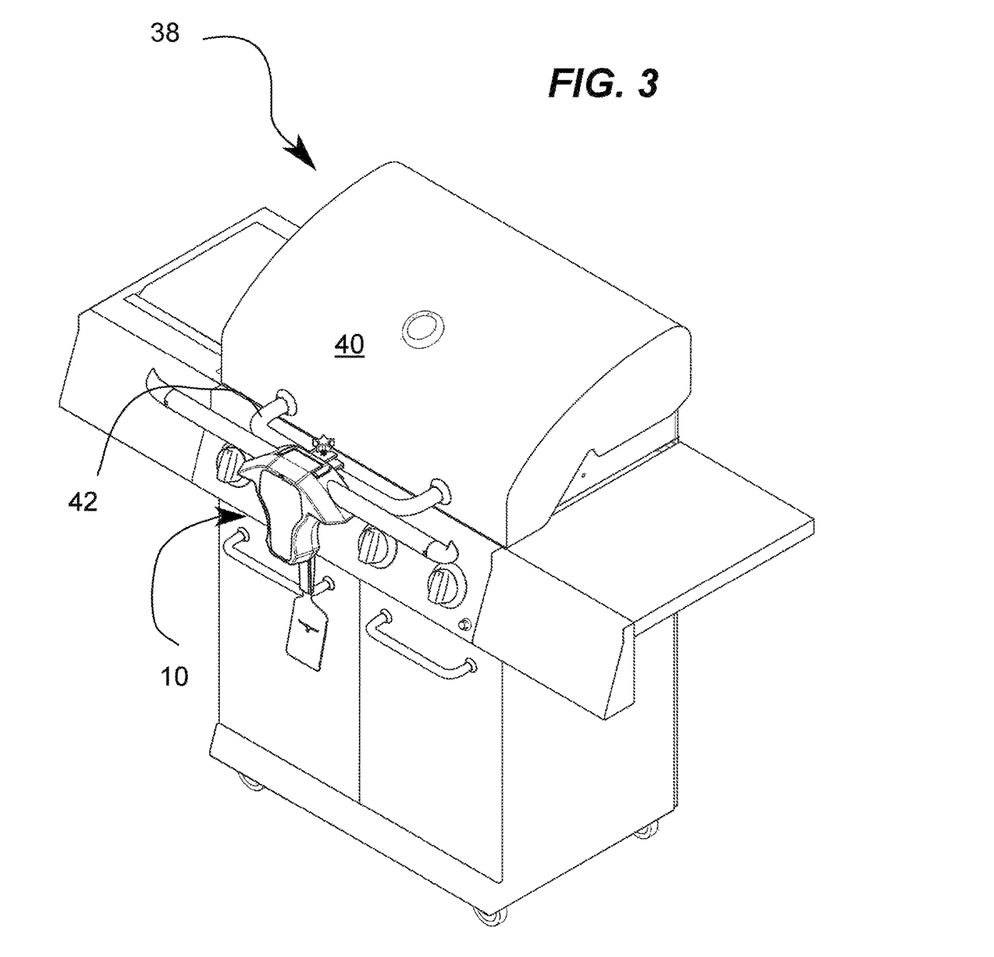
FIG. 3 Isometric view of the invention in context.
Figures 4A, 4B, 4C:
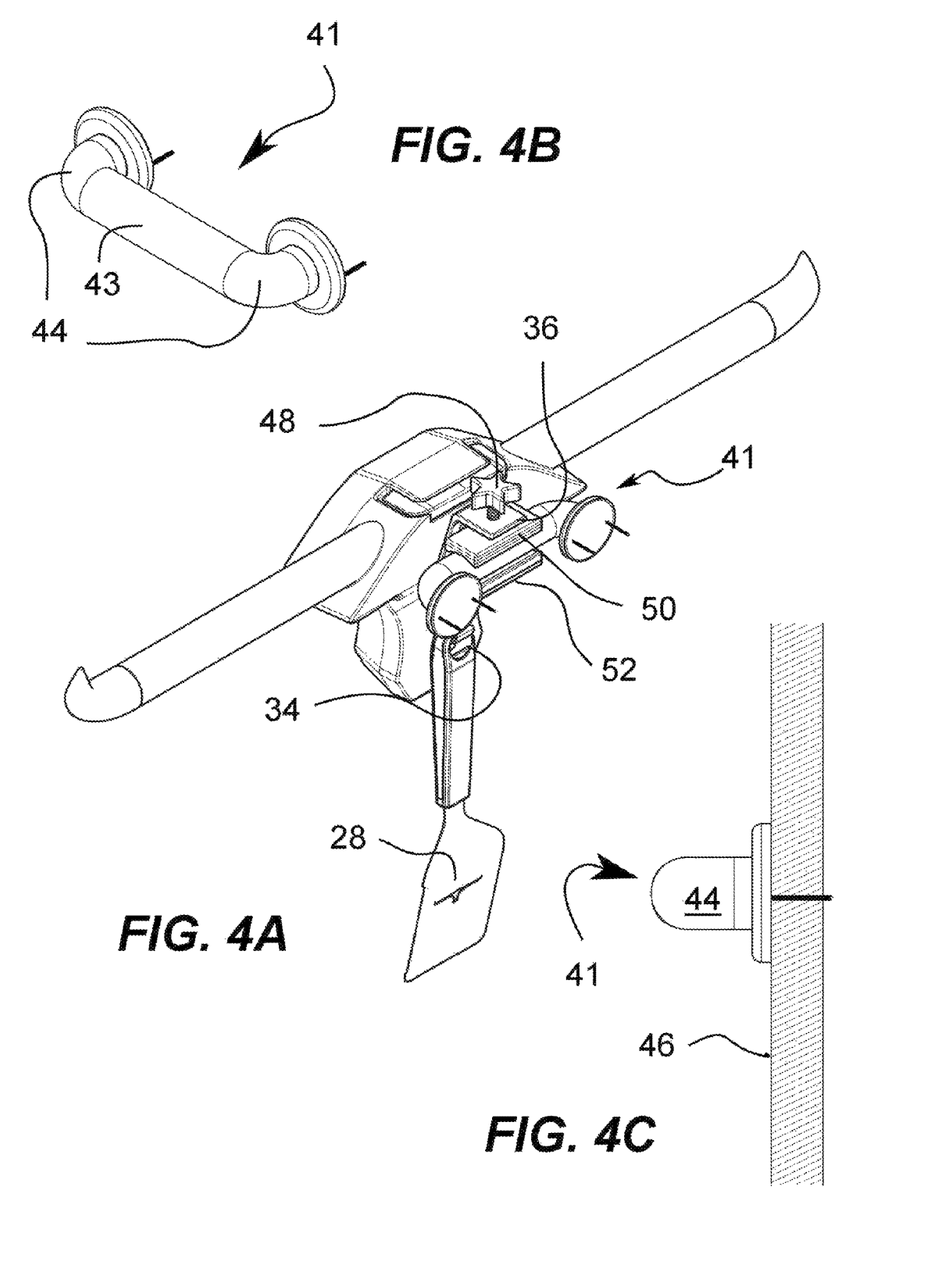
FIG. 4A Isometric view of the invention with the support member.
FIG. 4B Isometric view of the support member.
FIG. 4C Side view of the support member mounted on a vertical surface.
Figure 5A:
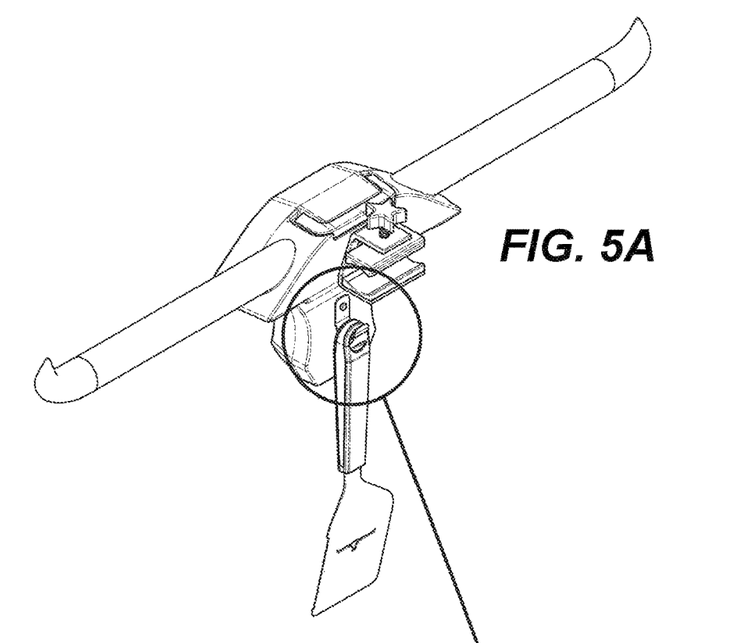
FIG. 5A Isometric view favoring the rear of the invention.
Figure 5B:
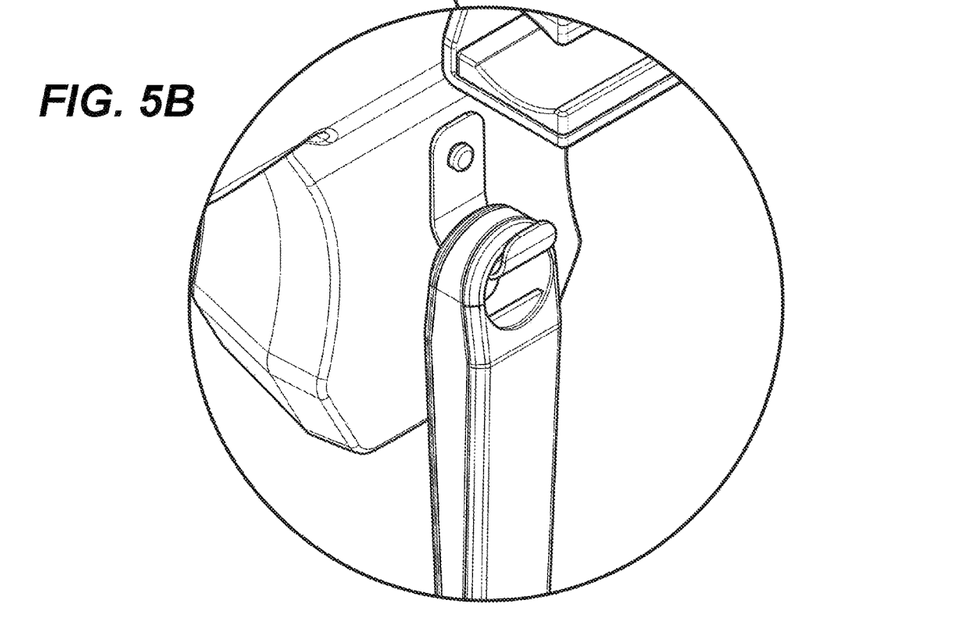
FIG. 5B Isometric view of the book holding the spatula.
Figures 6A, 6B, 6C:
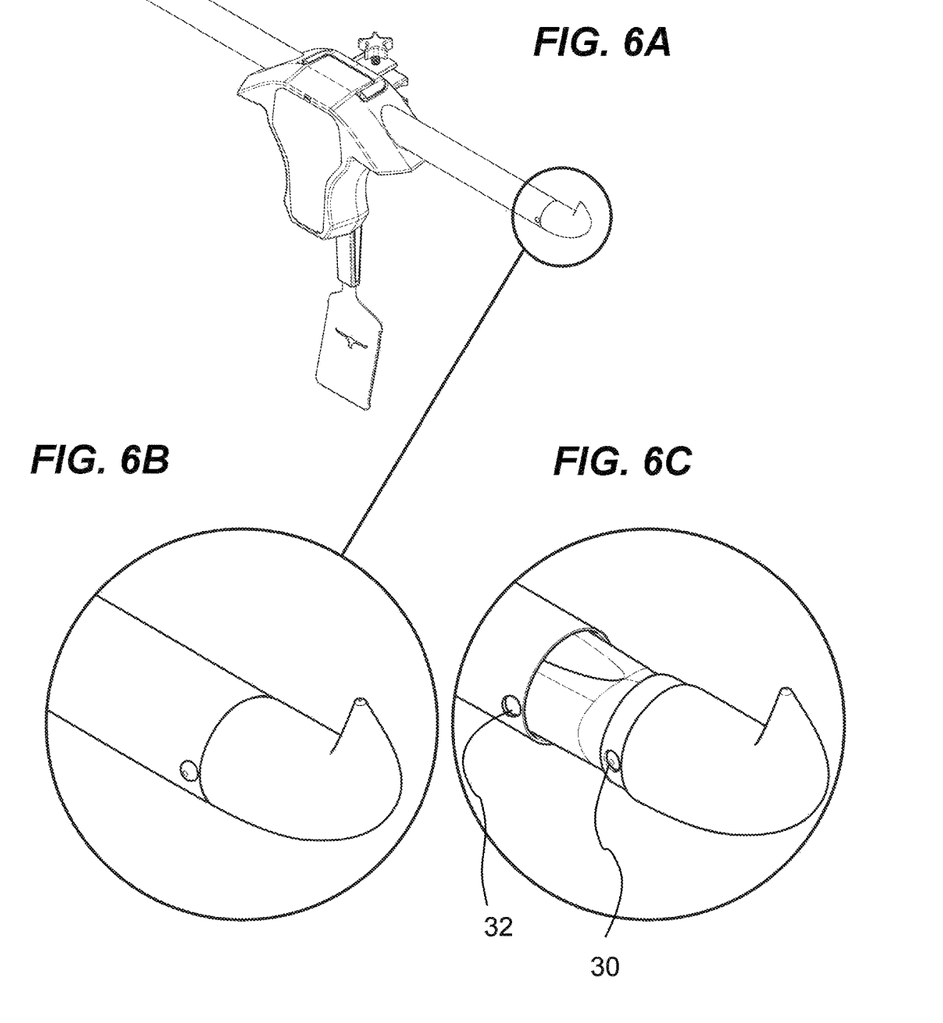
FIG. 6A Isometric view of the invention favoring the front.
FIG. 6B Isometric view of push button.
FIG. 6C Same as 6B but with pincer partially out.

When the design of the barbeque grill (38) does not have a suitable handle. A support member (41) can be installed next to the grill (38) or on it at some suitable location. The support member (41) consists in a horizontal bar (43) held between a pair of bracket members (44) which can be mechanically fastened to a surface (46). No matter if the tool holder (10) is installed on the handle member (44) or the support member (41), it can be installed temporarily and carried using the carrying handle (55), or installed in a more permanent fashion.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A barbeque utensil and tool holder comprising an attachable head member, a conduit comprising two open ends, in operative connection with said attachable head member, a first horn utensil insertable into one end of said conduit and a second horned utensil insertable into one end of the conduit; an adjustable clamp member to attach said utensil and tool holder onto a support member.

2. The Bar B Q utensil and tool holder as in claim 1 wherein a spatula is releasably attached onto a spatula hook located at the rear of said head member.

3. The barbeque utensil and tool holder as in claim 1 wherein a push button releasably engages a hole located in one of said open end of said conduit and a second push button engages a hole located in the opposite open end of said conduit so as to control the release of utensils.

4. The barbeque utensil and tool holder as in claim 1 wherein a scrubber brush is inserted inside said head and behind a lid member.

5. The barbeque utensil and tool holder as in claim 1 wherein said adjustable clamp member is located at the rear of said head member so as to allow for said utensil and said tool holder to be attached to a handle member forming part of a hood member on a barbeque grill.

6. The barbeque utensil and tool holder as in claim 1 wherein said support member consists in a horizontal bar held between a pair of bracket members for mechanically fastening said support member onto a surface.

7. The barbeque utensil and tool holder as in claim 1 wherein there is a carrying handle to carry said utensil and tool holder.

8. A combination of a barbeque grill and a barbeque utensil and toot holder wherein said barbeque, said utensil and said tool holder comprising an attachable head member, a conduit comprising two open ends, in operative connection with said attachable head member, a first horn utensil insertable into one end of said conduit and a second homed utensil insertable into one end of the conduit an adjustable dip clamp member to attach said utensil and tool holder onto a support member.

9. The combination of claim 8 wherein a spatula is releasably attached onto a spatula hook located at the rear of said head member.

10. The combination of claim 8 wherein a push button releasably engages a hole located in one of said open end of said conduit and a second push button engages a hole located in the opposite open end of said conduit so as to control the release of utensils.

11. The combination of claim 8 wherein a scrubber brush is inserted inside said head and behind a lid member.

\* \* \* \* \*